UNITED STATES PATENT OFFICE.

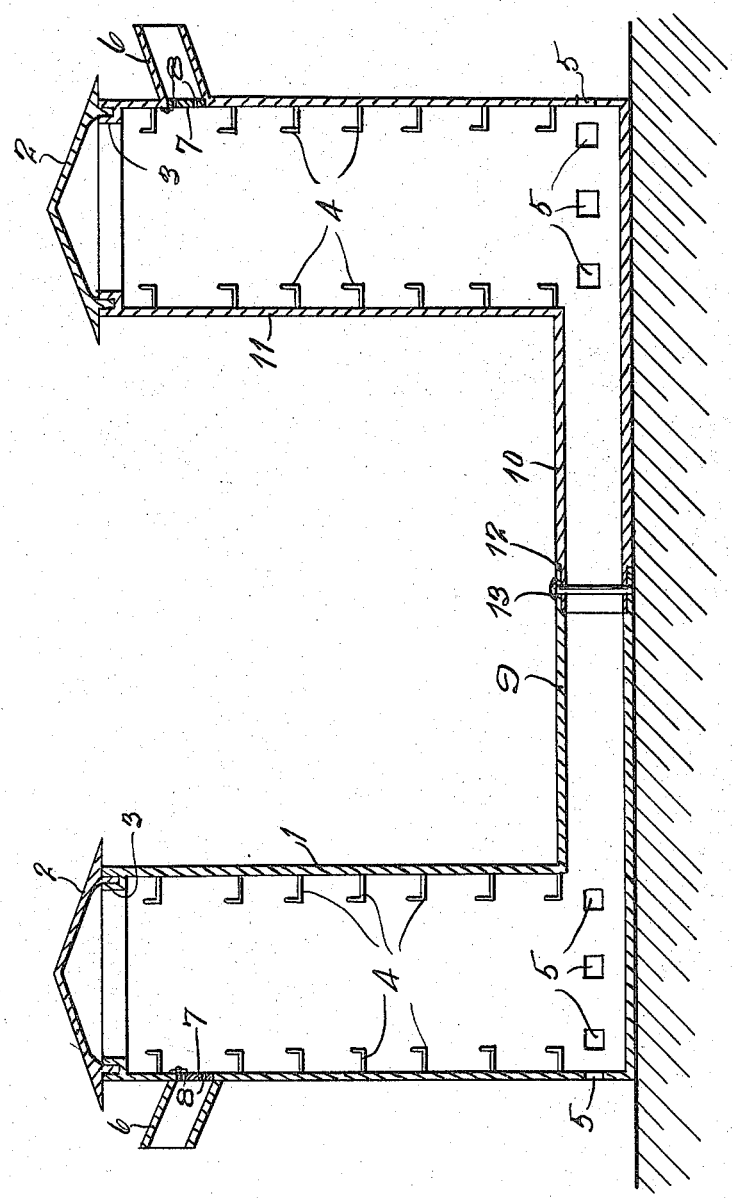

JOSEPH S. PINN, OF NEENAH, VIRGINIA.

BEEHIVE.

1,152,216.  Specification of Letters Patent.  Patented Aug. 31, 1915.

Application filed October 29, 1914. Serial No. 869,265.

*To all whom it may concern:*

Be it known that I, JOSEPH S. PINN, a citizen of the United States, residing at Neenah, in the county of Westmoreland and State of Virginia, have invented certain new and useful Improvements in Beehives; and I do hereby declare the following to be a full, clear, and exact description of the invention, such as will enable others skilled in the art to which it appertains to make and use the same.

This invention relates to bee hives and the primary object of the invention is to construct a bee hive so that a pair or plurality of hives may be connected together for guiding the bees from one hive into the other, by smoking them out prior to removing the honey from the hive.

Another object of this invention is the provision of a bee hive which is provided with a spout secured to one side thereof adjacent the upper end which provides for the inserting of smoke into the interior of the bee hive for forcing the bees out of the same, and also to provide a rearwardly extending passage way upon the lower end of the hive through which the bees pass out of the hive into a second hive which is connected to the first hive by means of the rearwardly extending passage way.

With the foregoing and other objects in view this invention consists in such novel features of construction, combination and arrangement of parts as will be hereinafter more fully described illustrated in the accompanying drawings and claimed.

In describing the invention in detail reference will be had to the accompanying drawings which show a sectional view through a pair of bee hives as constructed in accordance with this invention.

In the drawings like characters of reference are used for designating like or corresponding parts.

Referring more particularly to the drawings, 1 designates the rectangular body of the bee hive which has a roof or cover 2 detachably mounted thereupon, so that access may be gained to the interior of the bee hive for removing the honey therefrom. The removable roof or cover 2 is supported upon the upper end of the rectangular body portion 1 of the hive by an L-bracket 3 which extends around the entire surface of the inner side of the upper end of the body 1 of the bee hive. The bee hive body 1 has a plurality of racks secured to the sides thereof and extending inwardly into the same which are provided for supporting the honey within the hive. The lower end of the bee hive body 1 has a plurality of openings 5 formed therein and extending transversely through the sides of the same which are provided for permitting the bees to enter the hive for the purpose of depositing honey therein.

The hive body 1 has an inclined passage way or chute 6 secured to one side thereof adjacent the upper end of the same, which chute communicates with the interior of the hive body 1 and has a swingable door 7 forming a closure for the communication between the chute and the interior of the hive. The swingable door 7 is provided with a plurality of openings 8 so that the bees may pass therethrough when it is so desired or when they endeavor to enter the hive through the chute 6.

The hive body 1 has formed upon its lower end or secured thereto in any suitable manner and projecting rearwardly from one side thereof a chute 9 which forms a passage way and communicates with the interior of the hive body 1 adjacent the lower end of the same. The chute or passage way 9 is provided for connection with a chute or passage way 10 which is formed upon an identical hive structure 11. The hive 11 is constructed identical with the construction of the hive 1 1 and the chute or passage ways 9 and 10 of the hives 1 and 11 are connected by overlapping of their terminal ends as is indicated at 12 in the drawing, and by the insertion of a king bolt 13 through the overlapping meeting ends of the chute.

When it is desired to extract the honey from the hive 1, the openings 5 are closed, for preventing the bees from passing out of the hive through these openings, and the door 7 is swung inwardly and smoke is forced into the hive through the chute 6. The forcing of the smoke into and through the chute 6 will drive the bees from the hive, and as the passage way or chute 9 is the only means of egress from the hive except through the chute 6 through which the smoke is being forced, the bees will naturally pass through the chute or passage way 9 into the chute or passage way 10 and from there into the hive structure 11, after which the honey may be removed from the hive 1 without in any way seriously injuring the bees which were in the hive and which have formed the honey therein.

In reducing the invention to practice certain minor features of construction, combination and arrangement of parts may necessitate alterations to which the patentee is entitled provided such alterations are comprehended within the scope of what is claimed.

What is claimed is:—

In a bee hive, a body portion having a plurality of honey carrying brackets carried therein, a cover detachably mounted upon the upper open end of said body, an inclined chute formed upon one side of said body, a door forming a closure for the communication between said chute and the interior of said hive body, said hive being provided with a plurality of openings extending through the sides thereof adjacent the lower end of the hive for permitting of passage of bees into or out of the hive and a transversely extending chute formed upon one side of said hive at the lower end thereof and provided for connection with a chute formed upon a second hive as and for the purpose described.

In testimony whereof I affix my signature in presence of two witnesses.

JOSEPH S. PINN.

Witnesses:
ALBERT STUART,
C. CONWAY BAKER.

Copies of this patent may be obtained for five cents each, by addressing the "Commissioner of Patents, Washington, D. C."